United States Patent
Duan

(10) Patent No.: US 10,819,668 B2
(45) Date of Patent: Oct. 27, 2020

(54) REPLACING GRAPHICAL USER INTERFACE BASED ON CONFIGURATION FOR DISPLAYING MEDIA ON MOBILE DEVICE

(71) Applicant: Tencent Technology (Shenzhen) Company Limited, Shenzhen (CN)

(72) Inventor: Ying Duan, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/559,469

(22) Filed: Sep. 3, 2019

(65) Prior Publication Data

US 2019/0394148 A1    Dec. 26, 2019

Related U.S. Application Data

(63) Continuation of application No. PCT/CN2018/098928, filed on Aug. 6, 2018.

(30) Foreign Application Priority Data

Aug. 7, 2017 (CN) .......................... 2017 1 0666799

(51) Int. Cl.
*G06F 9/451* (2018.01)
*H04L 12/58* (2006.01)
(Continued)

(52) U.S. Cl.
CPC .............. *H04L 51/046* (2013.01); *G06F 9/44* (2013.01); *G06F 9/451* (2018.02); *G06F 21/62* (2013.01);
(Continued)

(58) Field of Classification Search
CPC . G06F 9/44; G06F 9/451; G06F 21/62; G06F 21/6245; G06F 2221/2141;
(Continued)

(56) References Cited

U.S. PATENT DOCUMENTS

2003/0023598 A1   1/2003 Janakiraman et al.
2011/0161882 A1*  6/2011 Dasgupta ............. H04N 21/812
                                                              715/830

(Continued)

FOREIGN PATENT DOCUMENTS

CN    102769818 A    11/2012
CN    105427130 A    3/2016

OTHER PUBLICATIONS

Tencent Technology, WO, PCT/CN2018/098928, Nov. 1, 2018, 4 pgs.

(Continued)

*Primary Examiner* — Le H Luu
(74) *Attorney, Agent, or Firm* — Morgan, Lewis & Bockius LLP

(57) ABSTRACT

This application discloses an information processing method performed by a mobile terminal. The method includes: displaying a first graphical user interface of a social networking application including multiple options for a first user to interact with other users; receiving a preset trigger operation on one of the multiple options for accessing information shared by the other users; generating and sending an access request to a server; receiving to-be-recommended first media information that matches a user profile of the first user and that is returned by the server based on the access request, and a first configuration parameter used for displaying the first media information; and replacing the first graphical user interface with a second graphical user interface by displaying the first media information in a (Continued)

personal information region of the second graphical user interface according to the first configuration parameter.

20 Claims, 12 Drawing Sheets

(51) Int. Cl.
  *G06F 21/62* (2013.01)
  *G06F 9/44* (2018.01)
(52) U.S. Cl.
  CPC ........ *G06F 21/6245* (2013.01); *H04L 51/063* (2013.01); *H04L 51/20* (2013.01); *H04L 51/26* (2013.01); *H04L 51/32* (2013.01); *G06F 2221/2141* (2013.01)
(58) Field of Classification Search
  CPC ............. G06F 16/24575; G06F 3/0481; G06F 3/04847; G06F 40/58; G06F 7/24; G06F 8/34; H04L 51/046; H04L 51/063; H04L 51/20; H04L 51/26; H04L 51/32; G01C 21/3682; G06Q 30/0613; H04M 1/72569; H04N 21/4755; H04N 21/812
  See application file for complete search history.

(56) References Cited

U.S. PATENT DOCUMENTS

| | | | | |
|---|---|---|---|---|
| 2011/0307241 | A1* | 12/2011 | Waibel | G06F 40/58 704/2 |
| 2013/0151991 | A1* | 6/2013 | Kimball | G06F 3/0481 715/753 |
| 2014/0201681 | A1* | 7/2014 | Mahaffey | H04M 1/72569 715/846 |
| 2014/0324814 | A1* | 10/2014 | Kraft | G06F 16/24575 707/707 |
| 2015/0212714 | A1* | 7/2015 | Hua | G06F 8/34 715/739 |
| 2016/0094504 | A1* | 3/2016 | Cinar | G06F 3/04847 715/752 |
| 2016/0127791 | A1* | 5/2016 | Roberts | H04N 21/4755 725/43 |
| 2016/0307249 | A1* | 10/2016 | Ku | G06Q 30/0613 |
| 2017/0329872 | A1* | 11/2017 | Dispensa | G06F 7/24 |
| 2018/0058863 | A1* | 3/2018 | Meyer | G01C 21/3682 |

OTHER PUBLICATIONS

Tencent Technology, IPRP, PCT/CN2018/098928, Feb. 11, 2020, 5 pgs.
Tencent Technology, ISR, PCT/CN2018/098928, Nov. 1, 2018, 2 pgs.

* cited by examiner

REPLACING GRAPHICAL USER INTERFACE BASED ON CONFIGURATION FOR DISPLAYING MEDIA ON MOBILE DEVICE

CROSS-REFERENCE TO RELATED APPLICATIONS

This application is a continuation application of PCT/CN2018/098928, entitled "INFORMATION PROCESSING METHOD AND APPARATUS, AND STORAGE MEDIUM" filed on Aug. 6, 2018, which claims priority to Chinese Patent Application No. 201710666799.1, entitled "INFORMATION PROCESSING METHOD AND APPARATUS, AND STORAGE MEDIUM" filed with the China National Intellectual Property Administration on Aug. 7, 2017, both of which are incorporated by reference in their entirety.

FIELD OF THE TECHNOLOGY

This application relates to information processing technologies, and specifically, to an information processing method and apparatus, and a storage medium.

BACKGROUND OF THE DISCLOSURE

At present, specified interfaces of many applications are provided with a preset spatial position, and a main function of the preset spatial position is a manner used for users to upload pictures themselves and show personalization of the current users. For example, a personal first-screen photo wall is set on a friend circle interface of a WeChat application, and whether users access friend circle interfaces of the users themselves or access friend circle interfaces of others, frequencies for accessing friend circle interfaces are relatively high. However, a display form of the personal first-screen photo wall is single, and users only have a photo change function. A photo source may be selected from an album in a terminal, or selected from a picture gallery on a website, or uploaded through instant shooting, and only supports static pictures. At one time, the personal first-screen photo wall can only display one picture, instead of a plurality of pictures. In addition, a user simple personalized service of the personal first-screen photo wall appears to be brief, and lacks interactions between users.

SUMMARY

Embodiments of this application provide an information processing method and apparatus, and a storage medium.

An embodiment of this application provides an information processing method, performed by a server, and the method includes: receiving an access request about a first application; obtaining a user feature corresponding to an access terminal sending the access request; determining to-be-recommended first media information for the access terminal from a first media information database based on the user feature; obtaining a first configuration parameter used for displaying the first media information; and pushing the first media information and the first configuration parameter to the access terminal, so that the access terminal displays the first media information on a specified interface of the first application according to the first configuration parameter.

An embodiment of this application further provides an information processing method, performed by an access terminal, and the method includes: obtaining, when receiving a preset trigger operation for a first application, an access request about the first application; sending the access request to a server; receiving to-be-recommended first media information that matches the access terminal and that is returned by the server based on the access request, and a first configuration parameter used for displaying the first media information; and displaying the first media information on a specified interface of the first application according to the first configuration parameter.

An embodiment of this application further provides an information processing apparatus, applied to a server, and the apparatus includes: a receiving module, configured to receive an access request about a first application; a first obtaining module, configured to obtain a user feature corresponding to an access terminal sending the access request; a determining module, configured to determine to-be-recommended first media information for the access terminal from a first media information database based on the user feature; a second obtaining module, configured to obtain a first configuration parameter used for displaying the first media information; and a sending module, configured to push the first media information and the first configuration parameter to the access terminal, so that the access terminal displays the first media information on a specified interface of the first application according to the first configuration parameter.

An embodiment of this application further provides an information processing apparatus, applied to an access terminal, and the apparatus includes: a fourth obtaining module, configured to obtain, when a preset trigger operation for a first application is received, an access request about the first application; a transceiver module, configured to send the access request to a server, and receive to-be-recommended first media information that matches the access terminal and that is returned by the server based on the access request, and a first configuration parameter used for displaying the first media information; and a displaying module, configured to display the first media information on a specified interface of the first application according to the first configuration parameter.

An embodiment of this application further provides an information processing system, and the system includes: an access terminal, configured to send an access request of a first application to a server; receive to-be-recommended first media information that matches the access terminal and that is returned by the server based on the access request, and a first configuration parameter used for displaying the first media information; and display the first media information on a specified interface of the first application according to the first configuration parameter; and a server, configured to receive an access request about a first application; obtain a user feature corresponding to an access terminal sending the access request; determine to-be-recommended first media information for the access terminal from a first media information database based on the user feature; obtain a first configuration parameter used for displaying the first media information; and push the first media information and the first configuration parameter to the access terminal.

An embodiment of this application further provides a storage medium, the storage medium stores a computer program, and after performed by a processor, the computer program can implement the information processing method applied to a server provided in any one of the foregoing technical solutions.

An embodiment of this application provides a storage medium, the storage medium stores a computer program, and after performed by a processor, the computer program can implement the information processing method applied to an access terminal provided in any one of the foregoing technical solutions.

DESCRIPTION OF EMBODIMENTS

This application is further described in detail below with reference to the accompanying drawings and embodiments. It should be understood that the specific embodiments described herein are only used to describe this application, instead of limiting this application.

Figure 1A:
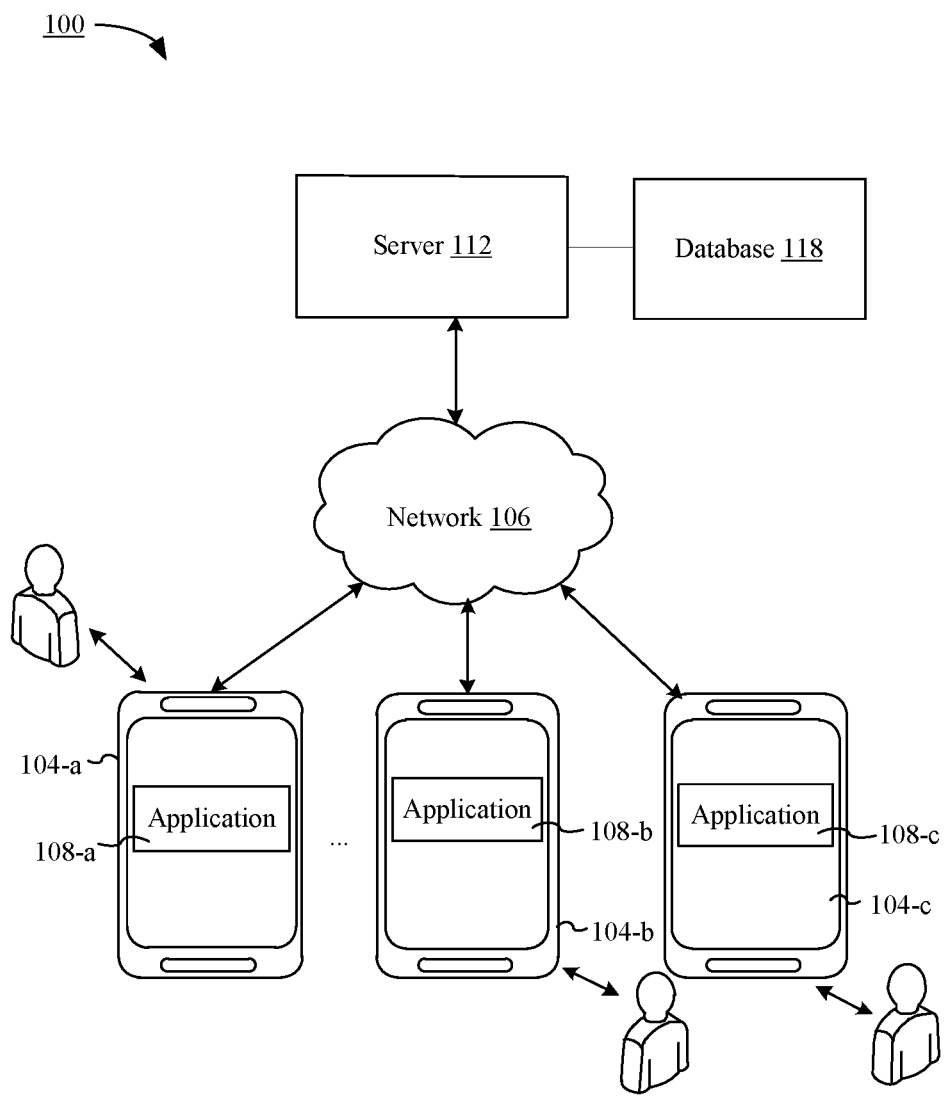
FIG. 1A is a schematic diagram of an operating environment 100 in some embodiments of this application.

FIG. 1A is a schematic diagram of an operating environment 100 in some embodiments of this application. As shown in FIG. 1A, terminal devices (for example, terminal devices 104-a to 104-c) of a plurality of users are respectively connected to a server 112 through a network 106.

In some embodiments, the server 112 maintains a database 118, the database 118 may store directional information of different media information, and the directional information includes a user feature of a target push object.

In some embodiments of this application, each user is connected to the server 112 through applications 108-a to 108-c executed on a terminal device 104.

The server 112 is configured to provide network services to the terminal device 104, for example, receive an access request about an application 108 sent by the terminal device 104, obtain a user feature corresponding to the terminal device 104, determine to-be-recommended media information for the terminal device 104 from the database 118 according to the user feature, obtain a configuration parameter used for displaying the media information, and push the media information and the configuration parameter to the terminal device 104.

The terminal device 104 is configured to display the media information on a specified interface of the application 108 according to the configuration parameter.

In some embodiments, examples of the terminal device 104 include, but are not limited to, a palmtop computer, a wearable computing device, a personal digital assistant (PDA), a tablet computer, a notebook computer, a desktop computer, a smartphone, or a combination of any two or more of these data processing devices or other data processing devices.

In some embodiments, the network 106 may include a local area network (LAN) and a wide area network (WAN) such as the Internet. The network 106 may be implemented by using any known network protocol, including various wired or wireless protocols.

In some embodiments, the server 112 may be implemented on one or more independent data processing apparatuses or distributed computer networks.

Figure 1B:
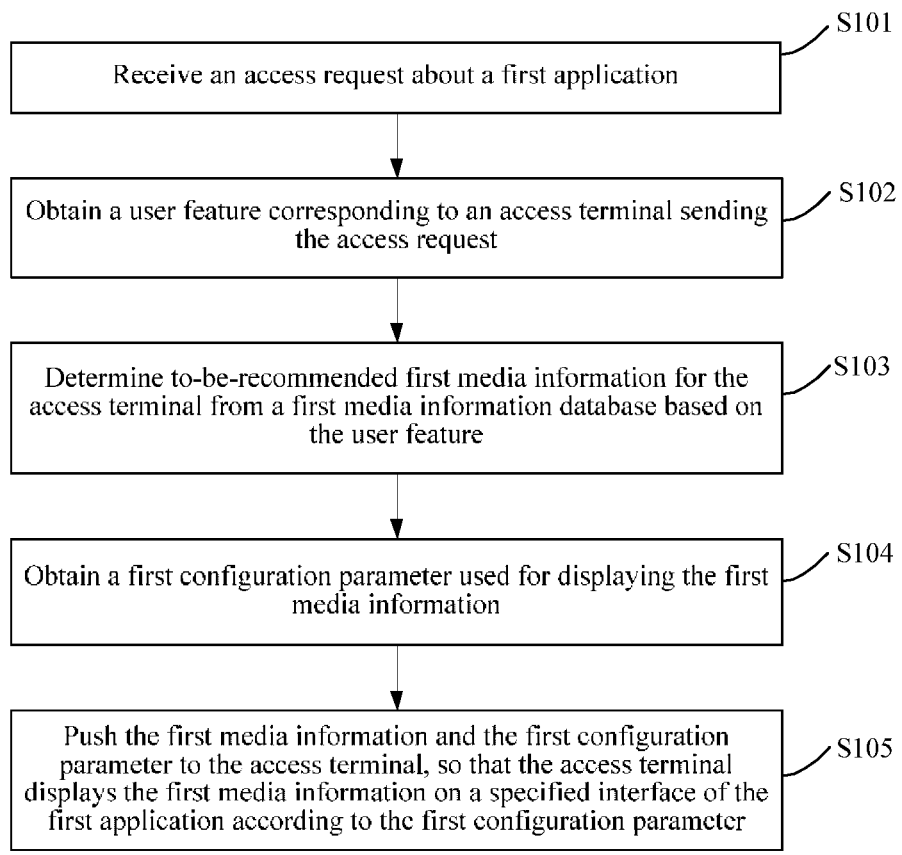
FIG. 1B is a schematic implementation flowchart of an information processing method according to an embodiment of this application.

An embodiment of this application provides an information processing method. The method may be performed at a server side. As shown in FIG. 1B, the method mainly includes:

Step S101: Receive an access request about a first application.

Specifically, the server receives an access request that is for accessing a specified interface of a first application of an accessed terminal and that is sent by an access terminal.

Herein, the first application is an application that has been installed in the access terminal and the accessed terminal, or an application that the access terminal can access.

The access request carries a terminal identifier of an access terminal sending the access request and/or a user account of a first application corresponding to the access terminal.

Further, the access request further carries a terminal identifier of an accessed terminal corresponding to the access request and/or a user account of a first application corresponding to the accessed terminal.

The specified interface of the first application is provided with a preset spatial position. One of functions of the preset spatial position is supporting users to upload second media information, and is a manner for showing personalization of the current users through the preset spatial position. Generally, the area of the specified interface is greater than or equal to the area of the preset spatial position.

Herein, the second media information includes, but is not limited to, a picture and a video. The picture includes a dynamic picture, a static picture, and a plurality of static pictures played in a loop.

In this way, interests of users in the preset spatial position can be enhanced, and further the users can better show themselves by using settings for the preset spatial position, thereby at least resolving the problem that a personal first-screen photo wall is single in a user personality expression form.

Herein, the first application may be an instant messaging application. For example, the instant messaging application includes applications such as WeChat. The first application may further be a social networking application. For example, the social networking application includes applications such as Tencent QQ and Tencent Weibo. Certainly, the first application may further be other types of applications, which are not listed herein again.

For example, if the first application is WeChat, the specified interface of the first application may be understood as a friend circle interface, and the preset spatial position may be understood as a personal first-screen photo wall. For another example, if the first application is QQ, the specified interface of the first application may be understood as a personal data interface of QQ, and the preset spatial position may be understood as a background wall of the personal data interface.

In an implementation, the receiving an access request about a first application includes: receiving an access request that is for accessing a specified interface of a first application corresponding to the access terminal and that is sent by the access terminal.

Correspondingly, the access request carries a terminal identifier of the access terminal and/or a user account of the first application corresponding to the access terminal.

That is, when the access terminal and the accessed terminal are the same terminal, the access request carries the terminal identifier of the access terminal or the user account of the first application corresponding to the access terminal. In this case, second media information corresponding to the accessed terminal may be locally loaded from the access terminal.

In another implementation, the receiving an access request about a first application includes: receiving an access request that is for the access terminal to access a specified interface of a first application corresponding to the accessed terminal and that is sent by the access terminal.

Correspondingly, the access request carries a terminal identifier of the access terminal or a user account of the first application corresponding to the access terminal, and a terminal identifier of the accessed terminal or a user account of the first application corresponding to the accessed terminal.

That is, when the access terminal and the accessed terminal are different terminals, the access request carries the terminal identifier of the access terminal or the user account of the first application corresponding to the access terminal. In addition, the access request further carries the terminal identifier of the accessed terminal or the user account of the first application corresponding to the accessed terminal, that is, an accessed user account.

In this way, the server can load the second media information corresponding to the accessed terminal.

Step S102: Obtain a user feature corresponding to an access terminal sending the access request.

In an implementation, before the obtaining a user feature corresponding to an access terminal sending the access request, the method further includes: obtaining a preset spatial position according to the specified interface; acquiring an interactive message that is on the preset spatial position and that is related to the access terminal; analyzing the interactive message to extract the user feature; and establishing a mapping relationship between the user feature and a terminal identifier of the access terminal and/or a mapping relationship between the user feature and a user account of the first application corresponding to the access terminal.

Herein, the mapping relationship may be stored in a first database.

Herein, the area of the specified interface is greater than or equal to the area of the preset spatial position. Generally, the area of the specified interface is greater than the area of the preset spatial position.

Herein, the interactive message includes at least a bullet screen message and a tag message.

In a specific implementation, the acquiring an interactive message that is on the preset spatial position and that is related to the access terminal includes: obtaining a first interactive message of an accessed terminal and the access terminal on the preset spatial position of the specified interface corresponding to the access terminal, where the first interactive message is an interactive message formed by operations of a user using the accessed terminal and a user using the access terminal on the preset spatial position corresponding to the access terminal; and supporting displaying the first interactive message on the preset spatial position.

The first interactive message includes at least a bullet screen message and a tag message.

In this way, the interactive message formed by the operations of the user of the accessed terminal and the user of the access terminal on the preset spatial position corresponding to the access terminal is analyzed to obtain the user feature of the access terminal.

Figure 2:
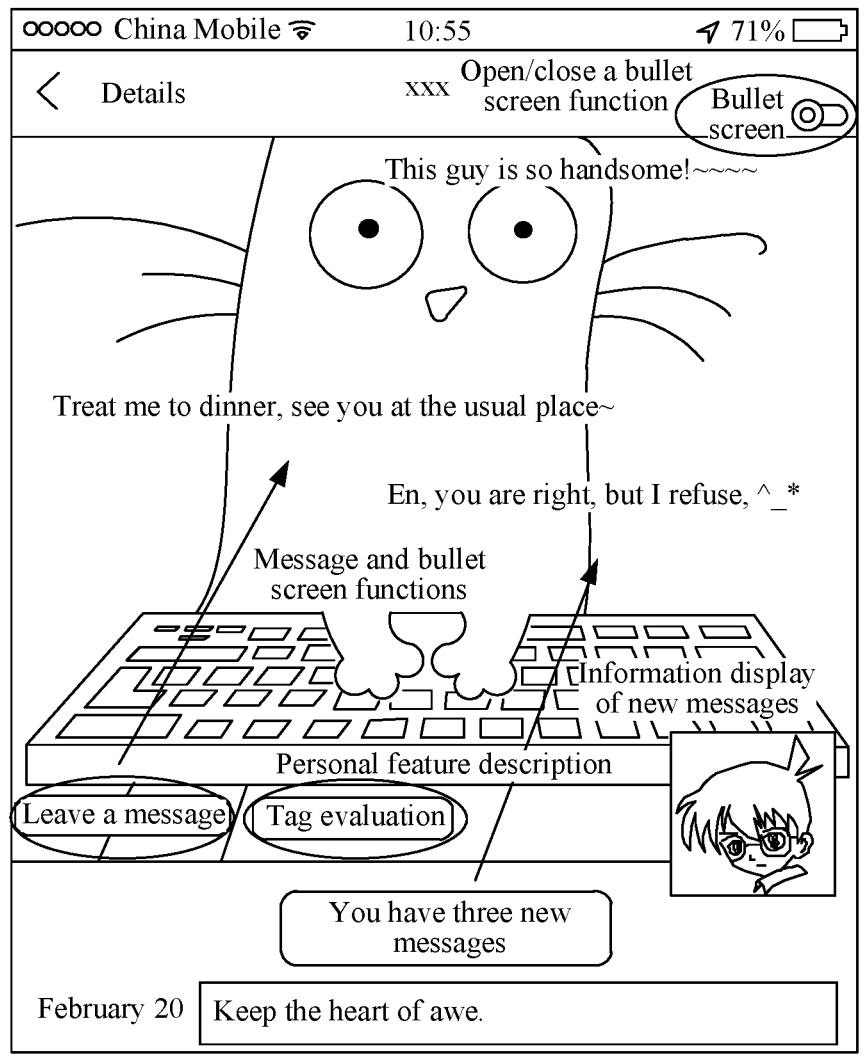
FIG. 2 is a schematic diagram of displaying a first interactive message on a preset spatial position according to an embodiment of this application.

FIG. 2 shows a schematic diagram of displaying a first interactive message on a preset spatial position. As can be seen from FIG. 2, the preset spatial position is provided with a "Leave a message" option. By clicking the option, a message can be left on the preset spatial position, and after the message is submitted, a bullet screen message corresponding to the message can be generated on the preset spatial position, and the bullet screen message is displayed. As shown in FIG. 2, a bullet screen function is in an open state, and a plurality of bullet screen messages is displayed on the preset spatial position. In this way, if the preset spatial position of the specified interface of the first application is accessed, a message function may be used, to enhance interactions between users.

Figure 3:
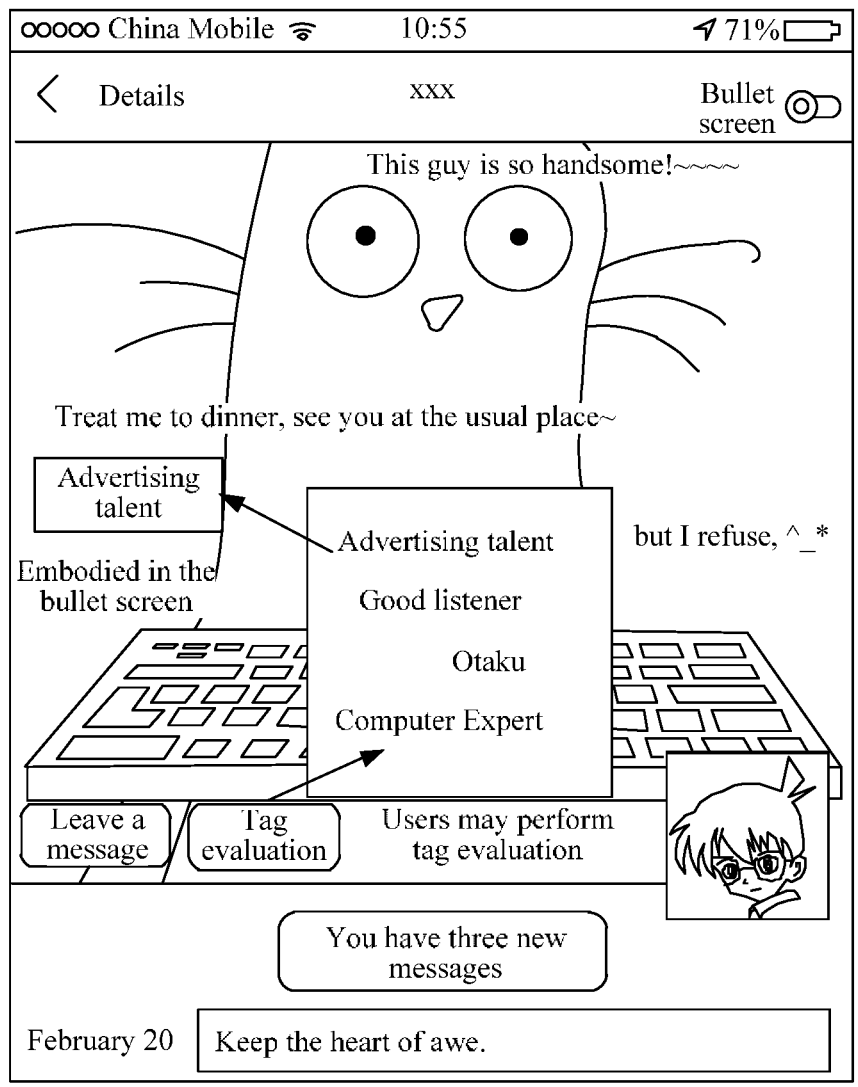
FIG. 3 is another schematic diagram of displaying a first interactive message on a preset spatial position according to an embodiment of this application.

FIG. 3 shows another schematic diagram of displaying a first interactive message on a preset spatial position. As can be seen from FIG. 3, the preset spatial position is provided with a "tag evaluation" option. By clicking the option, a tag can be made, and after the made tag is submitted, the tag can be generated on the preset spatial position, and the tag is displayed. A shown in FIG. 3, the "tag evaluation" function is in an open state, and a plurality of tags corresponding to the user is displayed on the preset spatial position. Certainly, it should be noted that, the system may provide a plurality of common tags, for users to select. When a first tag in the plurality of common tags is selected, it is determined that a tag is made successfully. After an access user makes the first tag for an accessed user and the tag is made successfully, if receiving a cancel operation of the access user, the system may delete the evaluation of the access user for the first tag of the accessed user. Certainly, the users may further edit tags in addition to the tags provided by the system. It should be noted that, users for whom tags are made may further cancel the tags made by themselves or others for the users for whom tags are made. In this way, if the preset spatial position of the specified interface of the first application is accessed, the tag evaluation function may be used, to enhance interactions between users.

In a specific implementation, the acquiring an interactive message that is on the preset spatial position and that is related to the access terminal includes: obtaining a second interactive message of the access terminal and the access terminal on the preset spatial position corresponding to the access terminal, where the second interactive message is an interactive message formed by operations of a user using the access terminal and a user using the access terminal on the preset spatial position corresponding to the access terminal; and displaying the second interactive message on the preset spatial position.

The second interactive message includes at least a bullet screen message and a tag message.

That is, the preset spatial position supports users to interact with themselves. For example, the users can send a bullet screen message on the preset spatial position, and reply to the bullet screen message. For another example, the preset spatial position supports users to make tags for themselves, and also supports the users to cancel one or more tags made for themselves by themselves.

Therefore, the interactive message formed by the operations of the user of the access terminal and the user on the preset spatial position corresponding to the access terminal is analyzed to obtain the user feature of the access terminal.

That is, the user feature in step S102 may be obtained by the server through analysis according to the acquired interactive message on the preset spatial position of the specified interface of the first application corresponding to the terminal.

In some embodiments, the user feature in step S102 may further be a user feature obtained in another way, such as obtained from an interface provided by a data management platform. The data management platform stores accounts of various types of applications and a correspondence between the accounts and user features corresponding to the accounts.

In some embodiments, the user feature in step S102 may further be a user feature obtained through comprehensive analysis according to the interactive messages on the preset spatial position with reference to a user feature obtained in another way.

Herein, the user feature is pre-acquired and determined, to make preparation for precisely pushing first media information matching the user feature corresponding to the access terminal to the access terminal subsequently.

In the foregoing solution, the method further includes: receiving a user setting request sent by the accessed terminal, and stores identifiers that no longer display users and that are included in the user setting request to a delete list.

Herein, the delete list may include identifiers that no longer display users, such as WeChat user identifier that no longer displays users; and the delete list may further include identifiers that no longer display terminals corresponding to users.

Therefore, for particular users who do not allow evaluating on the current user or do not allow sending a bullet screen message to the current user, identifiers of this type of particular users may be stored in the delete list, so that next time when the server receives a bullet screen message or a tag message sent to the accessed user by this type of particular users, the bullet screen message and the tag message sent by this type of particular users is no longer displayed at the accessed terminal side.

In this way, because users have permissions to allow which people to evaluate themselves, malicious harassment can be avoided.

Step S103: Determine to-be-recommended first media information for the access terminal from a first media information database based on the user feature.

In an implementation, the determining to-be-recommended first media information for the access terminal from a first media information database based on the user feature includes: extracting directional information of all first media information in the first media information database, where the directional information includes a user feature attribute of a target push object; and determining, when finding a user feature attribute matching the user feature from the first media information database, first media information corresponding to the user feature attribute as the to-be-recommended first media information.

In this way, the first media information matching the access terminal can be determined, to help implement precise push for the access terminal subsequently.

Herein, the user feature attribute includes N types of basic user features, where N is a positive integer. Various types of basic user features are obtained through classification according to standards such as gender, ages, occupations, temperament and character, workplaces, living areas, and consumption capabilities. For example, the user feature attribute determined according to gender includes male and female; the user feature attribute determined according to occupations includes administrative staff, technical staff, and service staff; and the user feature attribute determined according to living areas includes first-tier cities, second- and third-tier cities, and other districts.

However, the user feature obtained in step S102 is a specific user feature, such as the gender is male, the age is 30 years old, the occupation is a programmer, and the living area is Beijing.

In an implementation, the first media information database includes: Q pieces of first media information, where Q is a positive integer greater than or equal to 2. In the Q pieces of first media information, each piece of first media information has directional information, and first media information with the same directional information may be classified.

In a specific implementation, the determining to-be-recommended first media information for the access terminal from a first media information database based on the user feature includes:

when the obtained user feature includes W user features, where W is a positive integer greater than or equal to 2, preferentially selecting first media information meeting the W user features, and preferentially pushing the first media information meeting the W user features to the access terminal; and if no first media information meeting the W user features exists, determining S user features whose weight exceeds a preset weight value from the W user features according to a weight of each user feature, and searching the first media information database for first media information meeting the S user features, where $W > S \geq 1$.

Herein, the preset weight value may be adjusted according to an actual situation.

For example, the first media information database currently has 100 pieces of first media information. If the 100 messages are classified according to the user feature attribute of gender, 60 pieces of the first media information are suitable for being pushed to female and 40 pieces of the first media information are suitable for being pushed to male. If the 100 messages are classified according to the user feature attribute of ages, 10 pieces of the first media information are suitable for being pushed to an age group of below 18 years old, 50 pieces of the first media information are suitable for being pushed to an age group of 19 to 40 years old, 25 pieces of the first media information are suitable for being pushed to an age group of 41 to 60 years old, and 15 pieces of the first media information are suitable for being pushed to an age group of over 61 years old. If the 100 messages are classified according to the user feature attribute of living areas, 45 pieces of the first media information are suitable for being pushed to first-tier cities, 35 pieces of the first media information are suitable for being pushed to second- and third-tier cities, and 20 pieces of the first media information are suitable for being pushed to cities below third-tier cities. If the server obtains that the user feature corresponding to the access terminal includes: male, 30 years old, and the living area is Beijing, the server first obtains 40 pieces of first media information suitable for being pushed to male, 50 pieces of first media information suitable for being pushed to an age group of 19 to 40 years old, and 45 pieces of first media information suitable for being pushed to first-tier cities; and preferentially selects first media information meeting all the three user features from the first media information, and preferentially pushes the first media information meeting all the three user features to the access terminal. In this way, the first media information pushed to the access terminal can better meet user requirements.

In an implementation, before the obtaining a user feature corresponding to an access terminal sending the access request, the method further includes: obtaining a preset spatial position according to the specified interface; obtaining, when receiving an application operation for displaying preset first media information on the preset spatial position, application qualification information of the access terminal sending the application operation; receiving, when the application qualification information complies with a preset application qualification, the preset first media information uploaded by the access terminal sending the application operation; determining whether the preset first media information complies with a preset policy, and setting that the user feature of the access terminal has a permission state, if the preset first media information complies with the preset policy; and setting, in the permission state, first media information matching a terminal identifier of the access terminal and/or a user account of the first application corresponding to the access terminal as the preset first media information.

Herein, the preset first media information may be understood as first media information edited by users to push their own products.

Herein, the preset application qualification is a permission owned by users to display preset (or customized) first media information on their own preset spatial positions.

Herein, the preset policy includes: the first media information belongs to media information approved by national laws.

Further, the determining to-be-recommended first media information for the access terminal from a first media information database based on the user feature includes: extracting the preset first media information uploaded by the access terminal from the first media information database if the user feature of the access terminal has a permission state; and determining the preset first media information as the to-be-recommended first media information.

That is, when the access terminal has a permission of displaying the preset first media information on the preset spatial position of the specified interface of the first application of the access terminal, whether the access terminal accesses its own preset spatial position of the access terminal or other terminals access the preset spatial position of the access terminal, first media information customized by the access terminal is displayed on the preset spatial position.

Step S104: Obtain a first configuration parameter used for displaying the first media information.

Herein, the first configuration parameter includes a display position parameter representing the first media information.

The first configuration parameter further includes a parameter displaying a position relationship between the first media information and the second media information, where the second media information is media information corresponding to the accessed terminal.

The displayed position relationship between the first media information and the second media information includes: classification is performed according to whether display regions on the preset spatial position overlap, into: not overlapping, partially overlapping, and completely overlapping.

The displayed position relationship between the first media information and the second media information may further includes: classification is performed according to proportions in the preset spatial position, into: if a proportion of a display region of the first media information in a region occupied by the preset spatial position is represented by P1, and a proportion of a display region of the second media information in the region occupied by the preset spatial position is represented by P2, P1 is greater than P2, P1 is less than P2, and P1 is equal to P2.

It should be noted that, the displayed position relationship between the first media information and the second media information is not limited to the foregoing listed several situations, and may be set or adjusted according to a display requirement of first media information of a server side and a user requirement of a terminal side. This is not described herein again.

The method further includes: obtaining second media information corresponding to an accessed terminal, where the second media information is generated according to an operation parameter obtained from the specified interface of the first application; and obtaining a second configuration parameter used for displaying the second media information.

Herein, the second configuration parameter includes a display position parameter representing the second media information.

In an implementation, the obtaining second media information corresponding to the accessed terminal includes: obtaining an operation parameter of the accessed terminal side when detecting that the accessed terminal sets an operation of second media information on the specified interface of the first application; generating second media information according to the operation parameter; and displaying the second media information on the preset spatial position of the specified interface, and storing the second media information.

Herein, second media information corresponding to different terminals may be stored to a second database. A mapping relationship between the second media information and a terminal identifier of a terminal (such as an access terminal or an accessed terminal) and/or a mapping relationship between the second media information and a user account of a first application corresponding to a terminal (such as an access terminal or an accessed terminal) are/is established in the second database.

It should be noted that, the second database and the first database may be the same database, or may be two independent databases.

The method further includes: when detecting an operation that is for updating second media information on the preset spatial position and that is sent by a terminal, obtaining updated second media information, and updating original second media information in the second database as the updated second media information.

Herein, the terminal includes an access terminal and an accessed terminal.

In this way, when it can be ensured that the server receives an access operation for accessing the specified interface of the first application of the accessed terminal and that is sent by the access terminal, latest second media information set by the accessed terminal is pushed to the access terminal.

It should be noted that, in this embodiment, if the step of obtaining second media information corresponding to the accessed terminal exists, the execution sequence between the step of obtaining the second media information corresponding to the accessed terminal and the step of determining to-be-recommended first media information for the access terminal from a first media information database based on the user feature is not limited.

Step S105: Push the first media information and the first configuration parameter to the access terminal, so that the access terminal displays the first media information on a specified interface of the first application according to the first configuration parameter.

During the pushing the first media information and the first configuration parameter to the access terminal, the method further includes: pushing the second media information and the second configuration parameter to the access terminal, so that the access terminal displays the first media information and the second media information on the specified interface according to the first configuration parameter and the second configuration parameter respectively.

In an implementation, the displaying the first media information and the second media information on the specified interface according to the first configuration parameter and the second configuration parameter includes: displaying the first media information and the second media information on a preset spatial position of the specified interface according to the first configuration parameter and the second configuration parameter respectively.

For example, the first media information and the second media information are displayed on the preset spatial position by regions, or displayed by using transparency as a preset transparency value.

In this way, when the access terminal and the accessed terminal are different terminals, on the preset spatial position of the specified interface of the first application corresponding to the accessed terminal, not only the second media information corresponding to the accessed terminal can be displayed, but also first media information matching the user feature of the access terminal can be displayed.

In this way, when the access terminal and the accessed terminal are the same terminal, on the preset spatial position of the specified interface of the first application corresponding to the accessed terminal (or the access terminal), not only the second media information corresponding to the accessed terminal (or the access terminal) can be displayed, but also the first media information matching the user feature of the accessed terminal (or the access terminal) can be displayed.

The following provides description by using an example in which the first application is QQ, the specified interface of the first application is a personal data interface of QQ, and the preset spatial position is a background wall of the personal data interface.

Figure 4A:
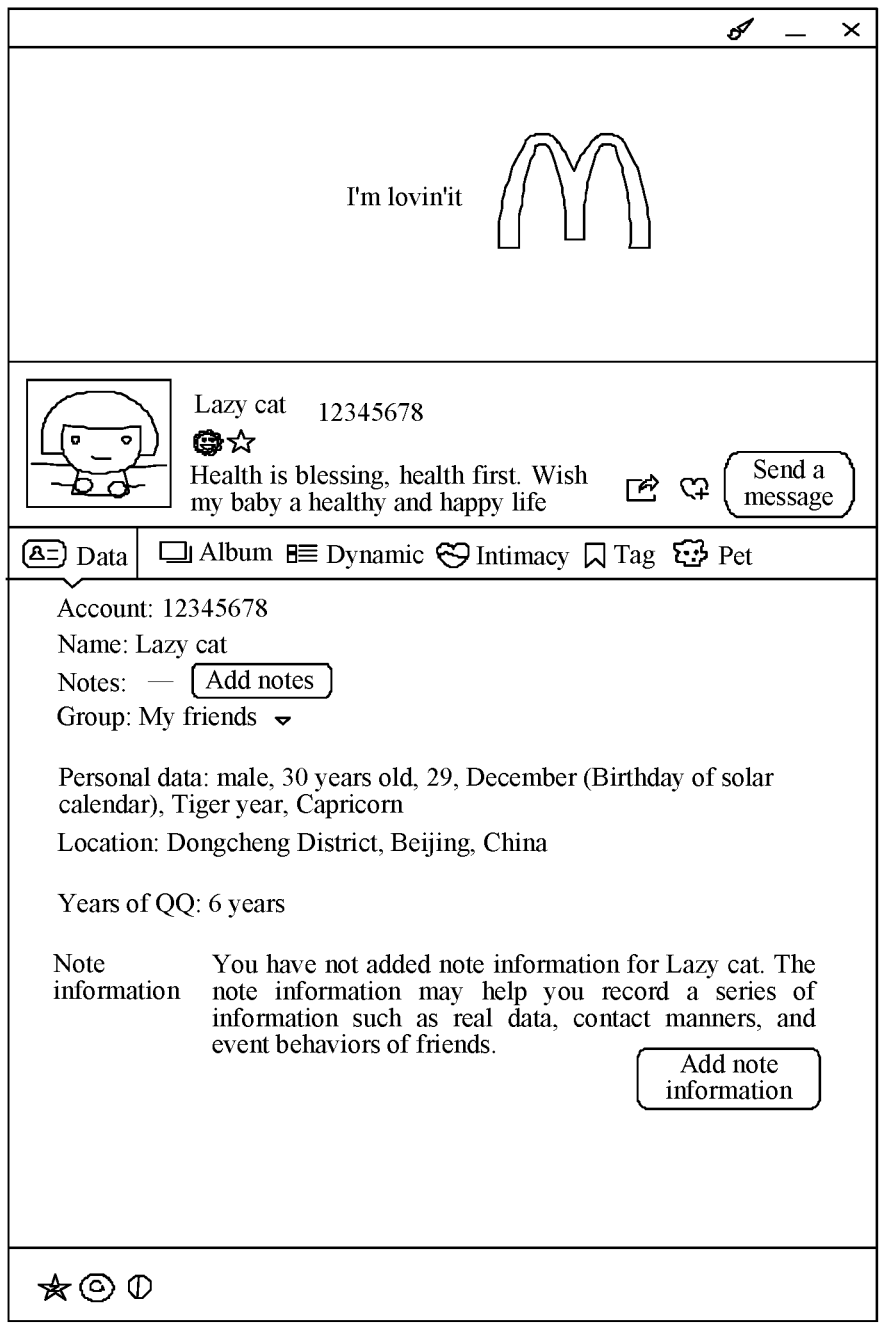
FIG. 4a is a schematic diagram of displaying first media information on a preset spatial position according to an embodiment of this application.
Figure 4B:
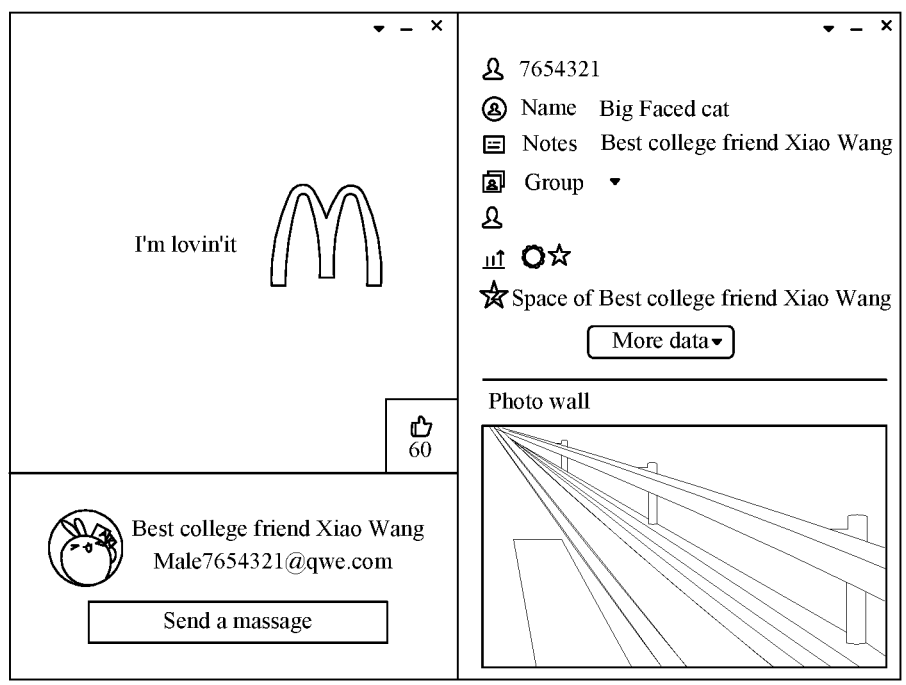
FIG. 4b is another schematic diagram of displaying first media information on a preset spatial position according to an embodiment of this application.

FIG. 4a shows a schematic diagram of displaying first media information on a preset spatial position. When receiving a message that user a accesses QQ personal data of a friend Lazy cat and that is sent by terminal A, the server determines that first media information matching a user feature of user a is a McDonald's advertisement, and then sets a first configuration parameter as: displaying the first media information on a background wall of a QQ personal data interface. When receiving the first media information and the first configuration parameter sent by the server, terminal A plays, according to the first configuration parameter, the McDonald's advertisement on the background wall of the QQ personal data interface of the friend Lazy cat accessed by user a. As can be seen from FIG. 4a, the McDonald's advertisement is played on the background wall of the QQ personal data interface of the friend Lazy cat accessed by user a, a picture corresponding to the background wall of the QQ personal data interface of the friend Lazy cat is currently invisible to users; a button for closing advertisements is set on the McDonald's advertisement, and user a can close the currently played McDonald's advertisement by triggering the button. Likewise, FIG. 4b shows another schematic diagram of displaying first media information on a preset spatial position. When receiving a message that user a accesses QQ personal data of a friend Big faced cat and that is sent by terminal A, the server determines that first media information matching a user feature of user a is a McDonald's advertisement. Terminal A plays the McDonald's advertisement matching the user feature of user a on a preset spatial position of a QQ personal data interface of the friend Big faced cat accessed by user a.

The following provides description by using an example in which the first application is WeChat, the specified interface of the first application is a friend circle interface, and the preset spatial position is a personal first-screen photo wall.

Figure 4C:
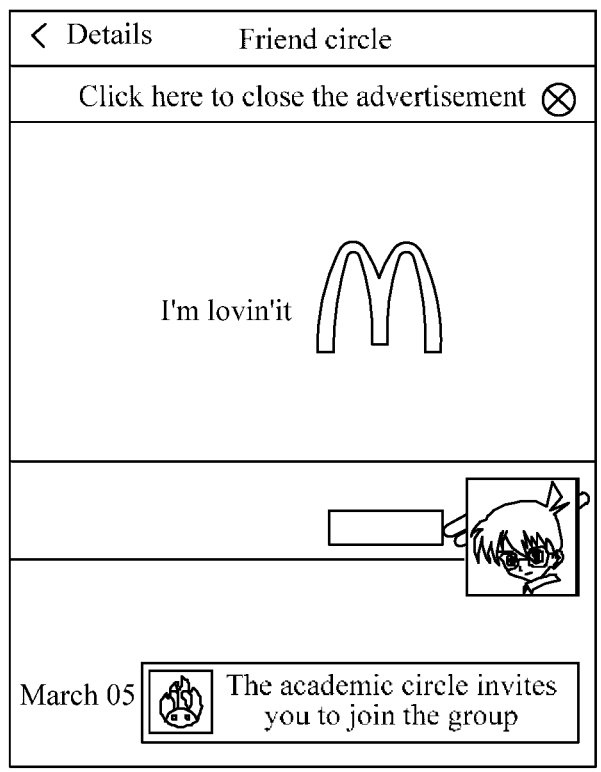
FIG. 4c is a schematic diagram of displaying first media information and second media information on a preset spatial position according to an embodiment of this application.

FIG. 4c shows a schematic diagram of displaying first media information and second media information on a preset spatial position. When receiving a message that user a accesses a WeChat friend circlet of user a and that is sent by terminal A, the server determines that first media information matching a user feature of user a is a McDonald's advertisement, obtains picture 1 (that is, a picture of a kitten tapping a keyboard shown in FIG. 5) set on a personal first-screen photo wall of the WeChat friend circle by user a, and then sets a first configuration parameter as: the first media information is displayed above the second media information, and transparency of the first media information is 0, so that while the first media information is visible to users, the second media information is invisible to users. When receiving a data packet that carries the first media information and the first configuration parameter and that is sent by the server, terminal A parses the data packet, and plays the McDonald's advertisement on the preset spatial position. As can be seen from FIG. 4c, if the McDonald's advertisement is played on the personal first-screen photo wall of the WeChat friend circle of user a, picture 1 is invisible to users; and a button for closing advertisements is set on the personal first-screen photo wall, and user a can close the currently played McDonald's advertisement by triggering the button.

Figure 5:
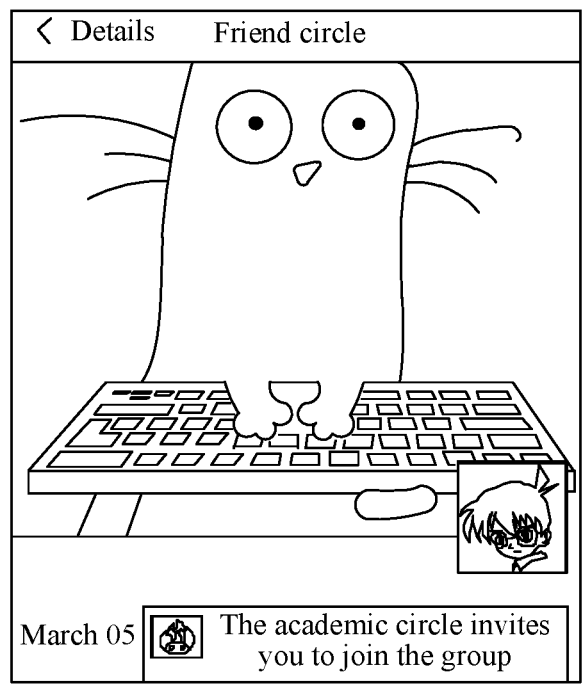
FIG. 5 is a schematic diagram of displaying second media information on a preset spatial position after first media information is closed in FIG. 4c according to an embodiment of this application.

FIG. 5 shows a schematic diagram of displaying second media information on a preset spatial position after first media information is closed in FIG. 4c. After the first media information is closed, or after the first media information is played completely, second media information preset (or customized) by user a is restored to be displayed on the preset spatial position. As can be seen from FIG. 5, after user a closes the McDonald's advertisement by triggering the button for closing advertisements, or after the McDonald's advertisement is played completely, the picture of a kitten tapping a keyboard, that is, picture 1, set by user a is displayed on the personal first-screen photo wall of user a.

In the foregoing solution, the method further includes: determining directional information of the first media information if receiving a request that is for closing the first media information and that is sent by the access terminal; adding the directional information to a comparison table of the access terminal, where the comparison table is used for storing directional information of first media information in which the access terminal has no interest; when pushing the first media information to the access terminal again, screening out to-be-recommended first media information from the first media information database with reference to the comparison table, so that this type of first media information including the directional information is no longer pushed to the access terminal within a preset period of time.

In this way, user requirements can be better met, first media information in which users have interest is recommended to the users, instead of first media information in which the users have no interest.

In the technical solutions of this embodiment, first media information matching a user feature corresponding to an access terminal can be pushed, so that the access terminal can display first media information corresponding to the access terminal and second media information corresponding to an accessed terminal on a specified interface of a first application corresponding to the accessed terminal, thereby resolving the problem in the existing technology that only the second media information corresponding to the accessed terminal can be displayed on the specified interface of the first application.

Figure 6:
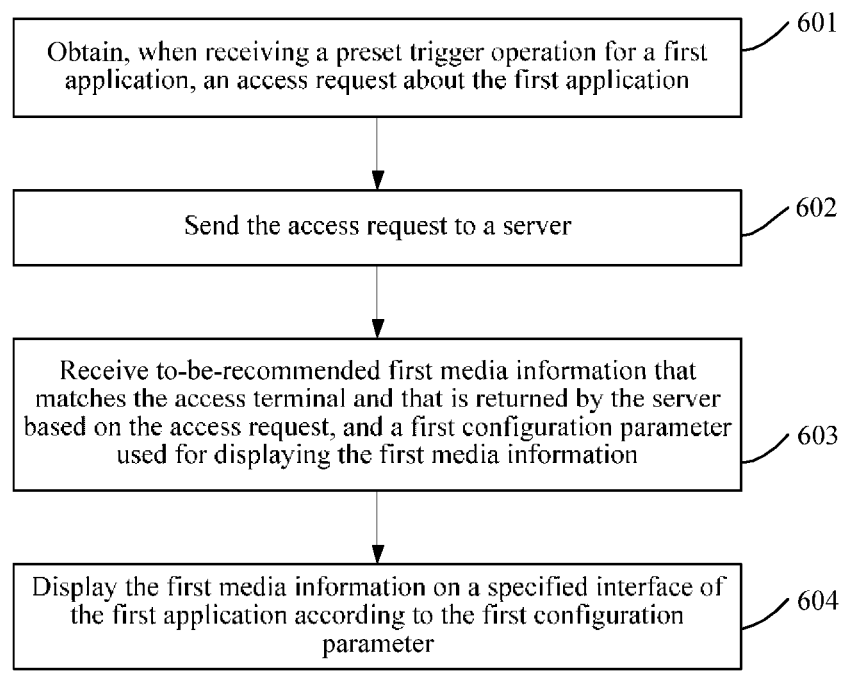
FIG. 6 is a schematic implementation flowchart of another information processing method according to an embodiment of this application.

An embodiment of this application provides an information processing method. The method is applied to a mobile terminal side. As shown in FIG. 6, the method mainly includes:

Step 601: Obtain, when receiving a preset trigger operation for a first application, an access request about the first application.

Herein, the preset trigger operation is an operation for accessing a specified interface of the first application. Before receiving the preset trigger operation, a first graphical user interface of a social networking application is displayed on the mobile terminal, the first graphical user interface including multiple options for a first user of the social networking application to interact with other users of the social networking application. The access request is generated in response to the preset trigger operation for accessing information shared by the other users with the first user.

In an implementation, the specified interface of the first application includes a preset spatial position. Third media information is displayed on a region on the specified interface except the preset spatial position. The third media information is information related to a user account of a first application corresponding to an accessed terminal. For example, the third media information may be a message posted by an accessed user account or may be a message posted by an added friend of an accessed user account.

For example, the first application is WeChat, and the preset trigger operation is an operation for accessing a WeChat friend circle.

Step 602: Send the access request to a server.

In an implementation, after obtaining the access request for accessing the first application corresponding to the accessed terminal, the access terminal sends the access request to the server, to receive a data packet returned by the server.

In another implementation, after obtaining the access request for accessing the first application corresponding to the access terminal, the access terminal sends the access request to the server, to receive a data packet returned by the server.

Step 603: Receive to-be-recommended first media information that matches the user profile of the first user using the access terminal and that is returned by the server based on the access request, and a first configuration parameter used for displaying the first media information.

In an implementation, during the receiving to-be-recommended first media information that matches the access terminal and that is returned by the server based on the access request, and a first configuration parameter used for displaying the first media information, the method further includes:

receiving second media information corresponding to the accessed terminal, and a second configuration parameter used for displaying the second media information. In some embodiments, the second media information is the information shared by the other users with the first user. These users become friends of the first user through the social networking application by being added to the contact list of the first user. In other words, the information is only shared with friends of a user of the social networking application.

A displayed position relationship between the first media information and the second media information includes: classification is performed according to whether display regions on the preset spatial position overlap, into: not overlapping, partially overlapping, and completely overlapping.

The displayed position relationship between the first media information and the second media information may further includes: classification is performed according to proportions in the preset spatial position, into: if a proportion of a display region of the first media information in a region occupied by the preset spatial position is represented by P1, and a proportion of a display region of the second media information in the region occupied by the preset spatial position is represented by P2, P1 is greater than P2, P1 is less than P2, and P1 is equal to P2.

Step 604: Display the first media information on a specified interface of the first application according to the first configuration parameter.

In an implementation, the displaying the first media information on a specified interface of the first application according to the first configuration parameter includes: when two or more pieces of to-be-recommended first media information are determined by the server, obtaining a play policy about the to-be-recommended first media information from the data packet, parsing the play policy to obtain a play sequence and a play interval of all the first media information; and playing corresponding first media information according to the play sequence and the play interval. In some implementations, the first graphical user interface is replaced with a second graphical user interface and the second graphical user interface includes a personal information region that the first user can edit and customize.

For example, two pieces of to-be-recommended first media information are determined for terminal D by the server, which are recorded as first media information X1 and first media information X2 respectively; and a preset play indicator of the server side is queried to obtain that expected play times x1 of first media information X1 is greater than expected play times x2 of second media information X2. Therefore, the play policy is formulated as: first playing first media information X1, and then playing first media information X2 10 minutes after the first media information X1 is played completely. Because there is a possibility of exiting the first application before the tenth minute, formulating the play policy can at least complete playing of first media information X1, to contribute to expected play times x1 of first media information X1.

In an implementation, the first configuration parameter is: display regions of the first media information and the second media information do not overlap, so that the first media information and the second media information are displayed as tiled.

For example, the first media information is displayed on a first region of the preset spatial position, and the second media information is displayed on a second region of the preset spatial position. The first region and the second region do not overlap. For example, the first region is located at the left side or the right side of the second region, or the first region is located above or below the second region.

In an implementation, the first configuration parameter is: the second media information is displayed above the first media information, and transparency of the second media information is a preset transparency value, so that while the second media information is visible to users, the first media information is also visible to users.

For example, if the preset transparency value is 50%, although the second media information is displayed on the first media information, users can still see the first media information.

The first configuration parameter may further include a window size proportion between the first media information and the second media information, and a degree of color contrast of display backgrounds between the first media information and the second media information.

It should be noted that, the configuration parameter is not limited to the foregoing listed several situations, and may be set or adjusted according to a display requirement of first media information of a server side and a user requirement of a terminal side. This is not described herein again.

In an implementation, if during the receiving to-be-recommended first media information that matches the access terminal and that is returned by the server based on the access request, and a first configuration parameter used for displaying the first media information, step 603 further includes: receiving second media information corresponding to the accessed terminal, and a second configuration parameter used for displaying the second media information, step 604 is: displaying the second media information on the specified interface according to the second configuration parameter when displaying the first media information on the specified interface of the first application according to the first configuration parameter.

Further, after the displaying the first media information on a specified interface of the first application according to the first configuration parameter, the method further includes: receiving a first operation, where the first operation is used for representing control for the first media information; determining whether the first operation is an approved operation; and responding to the first operation if the first operation is an approved operation.

Herein, the first operation includes, but is not limited to: closing a display window of the first media information; adjusting the size of the display window of the first media information, such as zooming out or zooming in the display window of the first media information; adjusting the position of the display window of the first media information, such as moving the display window of the first media information from a first position to a second position on the preset spatial position; suspending playing of the first media information; replaying the first media information; and accessing a link provided by the display window of the first media information.

In this way, not only it is ensured that the first media information matching the user feature corresponding to the access terminal can be pushed to the access terminal, and a put requirement of a put end for the first media information is met; but also users using the access terminal can control the pushed first media information, so that the users can manage the preset spatial position of the specified interface of the first application.

In the foregoing solution, the method further includes: if the first operation represents closing the first media information, sending the request for closing the first media information to the server, so that the server determines directional information of the first media information; adding the directional information to a comparison table of the access terminal, where the comparison table is used for storing directional information of first media information in which the access terminal has no interest; when pushing first media information to the access terminal again, screening out to-be-recommended first media information from the first media information database with reference to the comparison table, so that this type of first media information including the directional information is no longer pushed to the access terminal within a preset period of time.

Herein, the closing the first media information means that the first media information is closed before being played completely.

In this way, user requirements can be better met, first media information in which users have interest is recommended to the users, instead of first media information in which the users have no interest.

Further, the foregoing information processing method may further include: obtaining a first interactive message of another terminal and the access terminal on a preset spatial position of the specified interface of the first application corresponding to the access terminal from the server; and displaying the first interactive message on the preset spatial position, where the first interactive message is an interactive message formed by operations of a user using the another terminal and a user using the access terminal on the preset spatial position corresponding to the access terminal;

For example, user b triggers, by using terminal B, a "Leave a message" button on a preset spatial position of a specified interface of a first application of user a corresponding to access terminal A, and then inputs a message that user b intends to speak to user a. After the message is submitted, the message is displayed on the preset spatial position of the specified interface. After discovering the message of user b, user a may reply to the message on the preset spatial position of the specified interface, and the reply content may also be displayed on the preset spatial position of the specified interface.

The preset spatial position of the specified interface of the first application is provided with a first interactive message open button and a first interactive message close button. When the first interactive message open button is in a work state, the first interactive message is displayed on the preset spatial position of the specified interface. When the first interactive message close button is in a work state, the first interactive message is not displayed on the preset spatial position of the specified interface.

The first interactive message may be embodied in a form of a bullet screen message, or represented in a form of a tag. The bullet screen message includes, but is not limited to, a text and an animation. The tag may be a tag provided by the system for users to select, or may be a tag edited by users except tags provided by the system.

In this way, if a preset spatial position of another party is accessed, not only a message function may be used, but also a tag evaluation function may be used, to enhance interactions between users, thereby at least resolving the problem that a personal first-screen photo wall is single in a user personality expression form and lacks interactions with users.

Further, the foregoing information processing method may further include: obtaining a second interactive message of the access terminal and the access terminal on the preset spatial position corresponding to the access terminal from the server or the access terminal; and displaying the second interactive message on the preset spatial position, where the second interactive message is an interactive message formed by operations of a user using the access terminal and a user using the access terminal on the preset spatial position corresponding to the access terminal.

For example, user a accesses a specified interface of a first application of user a by using terminal A, triggers a "tag evaluation" button on a preset spatial position of the specified interface, and then inputs a tag made by user a for user a. After the tag is submitted, the tag is displayed on the preset spatial position of the specified interface. Likewise, after a period of time, if user a intends to cancel the tag evaluation, user a may further cancel the generated tag.

The preset spatial position of the specified interface of the first application is provided with a second interactive message open button and a second interactive message close button. When the second interactive message open button is in a work state, the second interactive message is displayed on the preset spatial position of the specified interface. When the second interactive message close button is in a work state, the second interactive message is not displayed on the preset spatial position of the specified interface.

The second interactive message may be embodied in a form of a bullet screen message, or represented in a form of a tag.

In actual application, the second interactive message open button and the first interactive message open button may share the same button, or may be two independent buttons. Likewise, the second interactive message close button and the first interactive message close button share the same button, or may be two independent buttons.

In this way, if a user accesses a preset spatial position of the user, the user may use a message function and may also use a tag evaluation function. The user may use the preset spatial position to display personality of the user or express emotions of the user, to resolve the problem that the personal first-screen photo wall is single in a user personality expression form and lacks interactions with users. Both the message function and the tag evaluation function may be managed and controlled at a terminal side of the user.

In the foregoing solution, the method further includes: receiving a user setting operation; generating a user setting request based on the user setting operation; sending the user setting request to the server, so that the server stores identifiers that no longer display users and that are included in the user setting request to a delete list, where the delete list may include identifiers that no longer display users, so that next time when receiving that users are no longer displayed to a bullet screen message or a tag message sent by the user. the server no longer pushes the bullet screen message and the tag message to the accessed terminal corresponding to the user.

For example, the identifier that no longer displays users may be WeChat user identifier that no longer displays users. Certainly, the delete list may include identifiers that no longer display terminals corresponding to the users.

In this way, because users have permissions to allow which people to evaluate themselves, malicious harassment can be avoided.

In an implementation, the information processing method further includes: when the specified interface of the first application is in an open state, obtaining an operation parameter if receiving an operation for setting second media information; generating second media information according to the operation parameter; and displaying the second media information on the preset spatial position of the specified interface.

Herein, the terminal includes an access terminal and an accessed terminal.

For example, when the terminal receives a click operation of a user on a preset spatial position of a specified interface of a first application, a button for setting or changing second media information is popped up, and when the terminal receives a trigger operation for the button for setting or changing second media information, after the user selects pre-changed or preset second media information, the terminal loads the pre-changed or preset second media information, to replace the original second media information.

In this way, interests of users in the preset spatial position can be enhanced, and further the users can better show themselves by using settings for the preset spatial position.

In an implementation, the method further includes: sending an application operation for displaying preset first media information on the preset spatial position to the server; and uploading the preset first media information to the server when receiving a notification message that application qualification information that is of the access terminal and that is sent by the server complies with a preset application qualification.

In an implementation, if the first media information passes auditing of the server, the displaying the first media information and the second media information on the specified interface of the first application according to the configuration parameter when receiving the access request for accessing the first application of the access terminal includes: displaying the second media information and the preset first media information on the preset spatial position of the specified interface of the first application.

Figure 7:
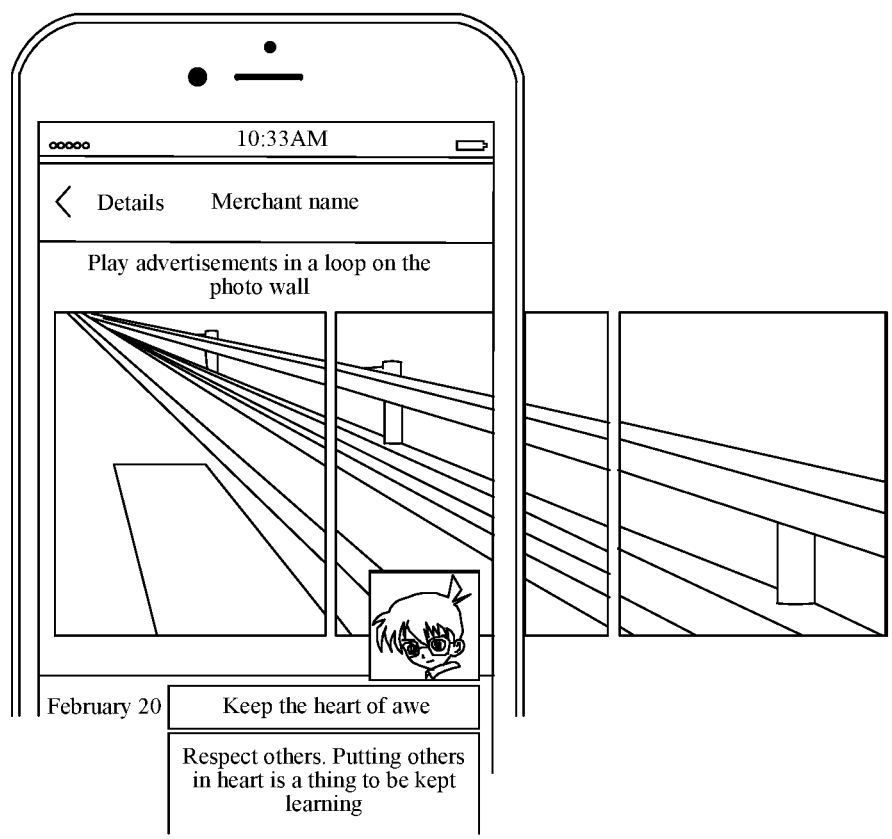
FIG. 7 is a schematic diagram of displaying preset first media information in a loop on a preset spatial position according to an embodiment of this application.

For example, FIG. 7 shows a schematic diagram of displaying preset first media information on a preset spatial position. Terminal C has a permission state, and when receiving a message that user c accesses a WeChat friend circle of user c and that is sent by terminal C, or that another terminal accesses a specified interface of a first application corresponding to terminal C, the server determines first media information matching a user feature of user c as the preset first media information uploaded by terminal C, and obtains picture 2 (not shown in FIG. 7) set on a personal first-screen photo wall of the WeChat friend circle by user c. As can be seen from FIG. 7, the preset first media information uploaded by terminal C is played in a loop on the specified interface of the first application corresponding to terminal C. That is, if terminal C has a permission state, whether user c of terminal C accesses the specified interface of the first application corresponding to terminal C or a user of another terminal accesses the specified interface of the first application corresponding to terminal C, the preset first media information uploaded by terminal C is displayed, so that a user using terminal C can better promote products of the user on the specified interface of the first application.

In the technical solutions of this embodiment, the access terminal can display first media information corresponding to the access terminal and second media information corresponding to an accessed terminal on a specified interface of a first application corresponding to the accessed terminal, thereby resolving the problem in the existing technology that only the second media information corresponding to the accessed terminal can be displayed on the specified interface of the first application.

Figure 8:
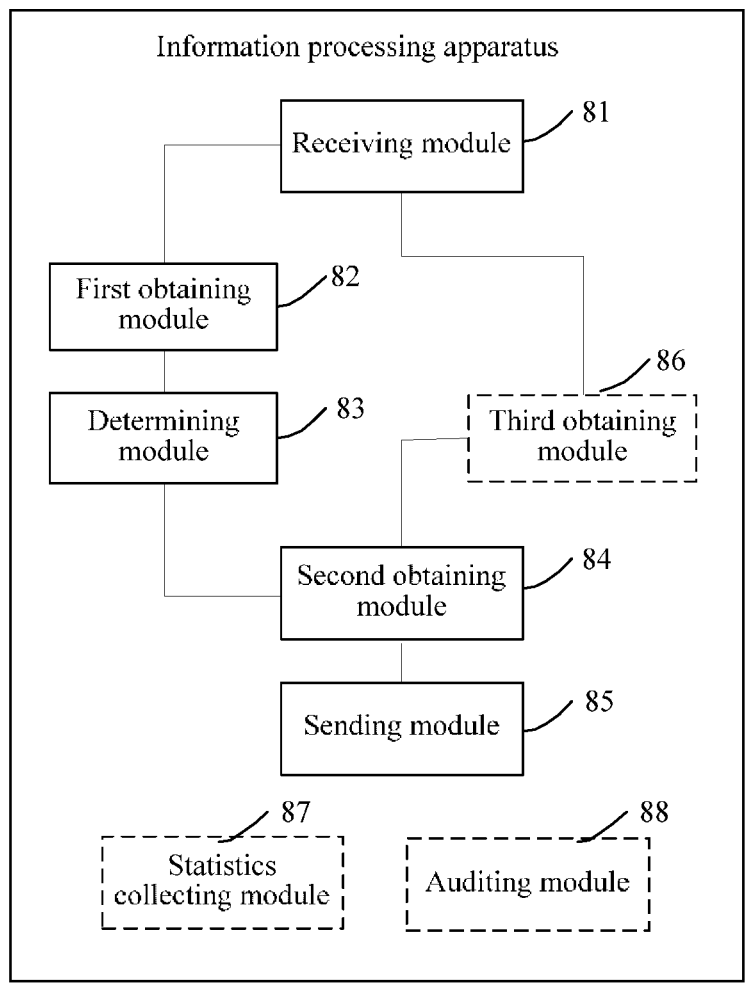
FIG. 8 is a schematic diagram of a composition structure of an information processing apparatus according to an embodiment of this application.

This embodiment records an information processing apparatus, applied to a server. As shown in FIG. 8, the apparatus includes: a receiving module 81, configured to receive an access request about a first application; a first obtaining module 82, configured to obtain a user feature corresponding to an access terminal sending the access request; a determining module 83, configured to determine to-be-recommended first media information for the access terminal from a first media information database based on the user feature; a second obtaining module 84, configured to obtain a first configuration parameter used for displaying the first media information; and a sending module 85, configured to push the first media information and the first configuration parameter to the access terminal, so that the access terminal displays the first media information on a specified interface of the first application according to the first configuration parameter.

In an embodiment, the apparatus further includes: a third obtaining module 86, configured to obtain second media information corresponding to an accessed terminal, where the second media information is generated according to an operation parameter obtained from the specified interface of the first application. The second obtaining module 84 is further configured to obtain a second configuration parameter used for displaying the second media information. The sending module 85 is further configured to push the second media information and the second configuration parameter to the access terminal when the first media information and the first configuration parameter are pushed to the access terminal, so that the access terminal displays the first media information and the second media information on the specified interface according to the first configuration parameter and the second configuration parameter.

In an embodiment, the apparatus further includes: a statistics collecting module 87, configured to: obtain a preset spatial position according to the specified interface before the user feature corresponding to the access terminal sending the access request is obtained; acquire an interactive message that is on the preset spatial position and that is related to the access terminal; analyze the interactive message to extract the user feature; and establish a mapping relationship between the user feature and a terminal identifier of the access terminal and/or a mapping relationship between the user feature and a user account of the first application corresponding to the access terminal.

In an implementation, the second obtaining module 84 is further configured to: before the sending module 85 pushes the first media information and the first configuration parameter to the access terminal, when two or more pieces of to-be-recommended first media information are determined by the determining module 83, formulate a play policy about the to-be-recommended first media information according to a preset play indicator of the server, where the play policy includes at least a play sequence and a play interval; and carry the play policy in the first configuration parameter.

In an embodiment, the apparatus further includes: an auditing module 88, configured to: obtain a preset spatial position according to the specified interface before the user feature corresponding to the access terminal sending the access request is obtained; obtain, when an application operation for displaying preset first media information on the preset spatial position is received, application qualification information of the terminal sending the application operation; receive, when the application qualification information complies with a preset application qualification, the preset first media information uploaded by the access terminal sending the application operation; determine whether the preset first media information complies with a preset policy, and set that the user feature of the access terminal has a permission state, if the preset first media information complies with the preset policy; and set, in the permission state, first media information matching a terminal identifier of the access terminal and/or a user account of the first application corresponding to the access terminal as the preset first media information.

In an implementation, the determining module 83 is further configured to: extract the preset first media information uploaded by the access terminal from the first media information database if the user feature of the access terminal has a permission state; and determine the preset first media information as the to-be-recommended first media information.

In an implementation, the determining module 83 is further configured to: extract directional information of all first media information in the first media information database, where the directional information includes a user feature attribute of a target push object; and determine, when finding a user feature attribute matching the user feature from the first media information database, first media information corresponding to the user feature attribute as the to-be-recommended first media information.

A person skilled in the art should understand that, for functions of the processing modules in the information processing apparatus of the embodiments of this application, reference may be made to related description of the foregoing information processing method applied to a server side. The processing modules in the information processing apparatus of the embodiments of this application may be implemented by an analog circuit for implementing the functions of the embodiments of this application, or may be implemented by running software for performing the functions of the embodiments of this application on the server.

In actual application, the first obtaining module 82, the determining module 83, the second obtaining module 84, the third obtaining module 86, the statistics collecting module 87, and the auditing module 88 may all be implemented by the information processing apparatus or a central processing unit (CPU), a micro controller unit (MCU), a digital signal processor (DSP), a programmable logic controller (PLC) or the like in the server to which the information processing apparatus belongs. The receiving module 81 may be implemented by the information processing apparatus or a receiver in the server to which the information processing apparatus belongs, and the sending module 85 may be implemented by the information processing apparatus or a transmitter in the server to which the information processing apparatus belongs; or the receiving module 81 and the sending module 85 may be implemented by the information processing apparatus or a communications module in the server to which the information processing apparatus belongs.

It should be noted that, the access terminal and the accessed terminal may be the same terminal, or may be different terminals.

In the information processing apparatus of this embodiment, first media information matching a user feature corresponding to an access terminal can be pushed, so that the access terminal can display the first media information and second media information corresponding to an accessed terminal on a specified interface of a first application corresponding to the accessed terminal, thereby resolving the problem in the existing technology that when the access terminal accesses the specified interface of the first application of the accessed terminal, only the second media information corresponding to the accessed terminal can be displayed on the specified interface of the first application corresponding to the accessed terminal.

Figure 9:
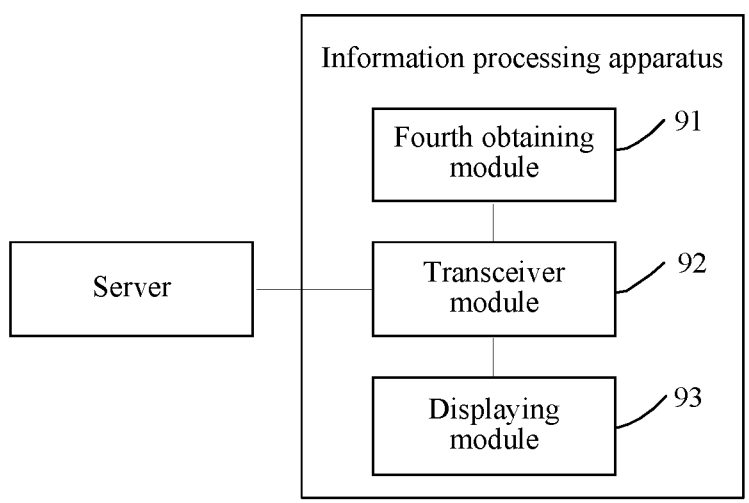
FIG. 9 is a schematic diagram of a composition structure of another information processing apparatus according to an embodiment of this application.

This embodiment records an information processing apparatus, applied to an access terminal. As shown in FIG. 9, the apparatus includes: a fourth obtaining module 91, configured to obtain, when a preset trigger operation for a first application is received, an access request about the first application; a transceiver module 92, configured to send the access request to a server; and receive to-be-recommended first media information that matches the access terminal and that is returned by the server based on the access request, and a first configuration parameter used for displaying the first media information; and a displaying module 93, configured to display the first media information on a specified interface of the first application according to the first configuration parameter.

In an implementation, the transceiver module 92 is further configured to receive second media information corresponding to an accessed terminal, and display a second configuration parameter of the second media information; and the displaying module 93 is further configured to: display the first media information and the second media information on the specified interface according to the first configuration parameter and the second configuration parameter.

In an implementation, the displaying module 93 is further configured to: when two or more pieces of to-be-recommended first media information are determined by the server, obtain a play policy about the to-be-recommended first media information from the first configuration parameter, parse the play policy to obtain a play sequence and a play interval of all the first media information; and play corresponding first media information according to the play sequence and the play interval.

In an implementation, the displaying module 93 is further configured to: receive a first operation after the first media information is displayed on the specified interface of the first application according to the configuration parameter, where the first operation is used for representing control for the first media information; determine whether the first operation is an approved operation; and respond to the first operation if the first operation is an approved operation.

In an implementation, the displaying module 93 is further configured to: obtain a first interactive message of another terminal and the access terminal on a preset spatial position of the specified interface corresponding to the access terminal; and display the first interactive message on the preset spatial position, where the first interactive message is an interactive message formed by operations of a user using the another terminal and a user using the access terminal on the preset spatial position corresponding to the access terminal; and/or obtain a second interactive message of the access terminal and the access terminal on a preset spatial position corresponding to the access terminal; and display the second interactive message on the preset spatial position, where the second interactive message is an interactive message formed by operations of a user using the access terminal and a user using the access terminal on the preset spatial position corresponding to the access terminal.

In an implementation, the displaying module 93 is further configured to: when the specified interface of the first application is in an open state, obtain an operation parameter if an operation for setting second media information is received; generate second media information according to the operation parameter; and display the second media information on the preset spatial position of the specified interface.

In an implementation, the transceiver module 92 is further configured to: upload preset first media information to a server; and the displaying module 93 is further configured to: if the first media information passes auditing of the server, when the access request for accessing the first application of the access terminal is received, display the preset first media information or the second media information and the preset first media information on the specified interface of the first application according to the configuration parameter.

A person skilled in the art should understand that, for functions of the processing modules in the information processing apparatus of the embodiments of this application, reference may be made to related description of the foregoing information processing method applied to a terminal side. The processing modules in the information processing apparatus of the embodiments of this application may be implemented by an analog circuit for implementing the functions of the embodiments of this application, or may be implemented by running software for performing the functions of the embodiments of this application on the terminal.

In actual application, both the fourth obtaining module 91 and the displaying module 93 may be implemented by the information processing apparatus or a CPU, an MCU, a DSP, a PLC or the like in the terminal to which the information processing apparatus belongs. The transceiver module 92 may be implemented by the information processing apparatus or a communications module in the terminal to which the information processing apparatus belongs.

It should be noted that, the access terminal and the accessed terminal may be the same terminal, or may be different terminals.

Figure 11:
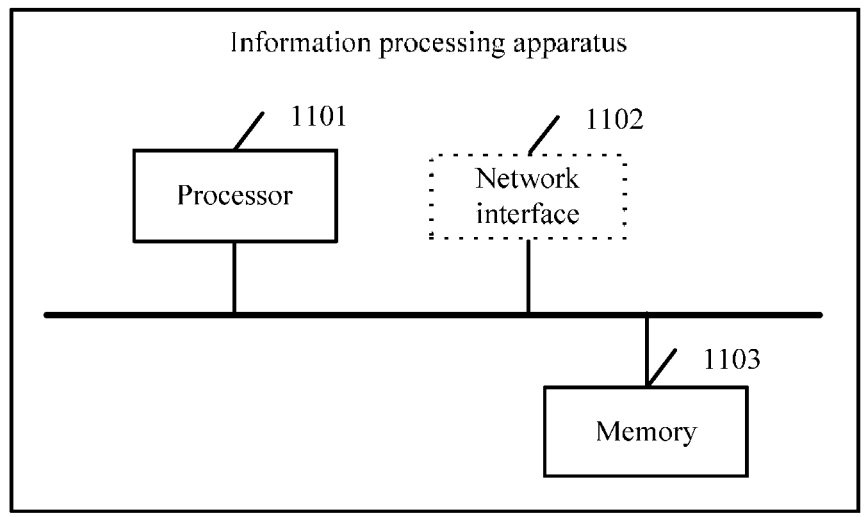
FIG. 11 is a schematic diagram of a composition structure of another information processing apparatus according to an embodiment of this application.

This embodiment records an information processing apparatus, applied to a server. As shown in FIG. 11, the apparatus includes: a processor 1101 and a memory 1103. The apparatus may further include a network interface 1102. The network interface 1102 is configured to receive an access request about a first application, and push first media information and first configuration parameter to an access terminal. The memory 1103 stores instructions capable of being executed by the processor 1101. When the instructions are executed, the processor is configured to perform the information processing method applied to a server side shown in FIG. 1, which is not described herein again.

Figure 12:
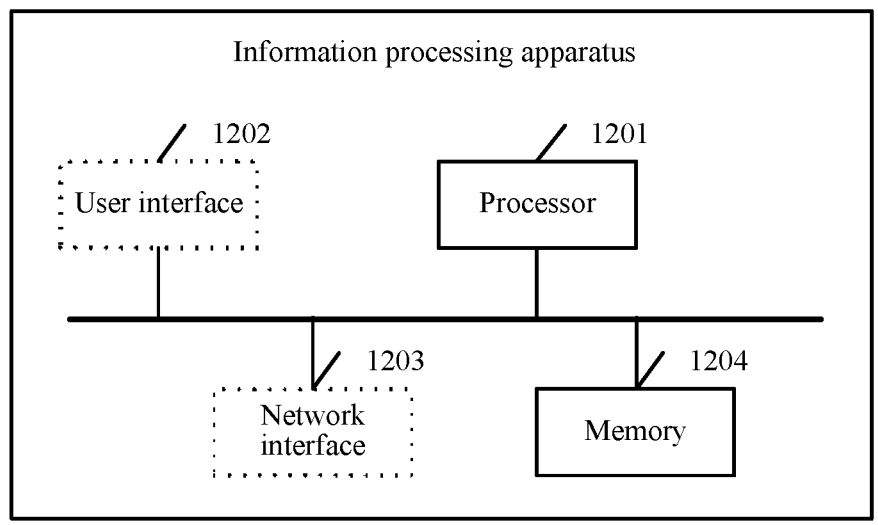
FIG. 12 is a schematic diagram of a composition structure of another information processing apparatus according to an embodiment of this application.

This embodiment records an information processing apparatus, applied to an access terminal. As shown in FIG. 12, the apparatus includes: a processor 1201 and a memory 1204. The apparatus may further include a user interface 1202 and a network interface 1203. The user interface 1202 is configured to receive a preset trigger operation for a first application. The network interface 1203 is configured to send an access request to a server, and receive to-be-recommended first media information that matches the access terminal and that is returned by the server based on the access request. The memory 1204 stores instructions capable of being executed by the processor 1201. When the instructions are executed, the processor is configured to perform the information processing method applied to a terminal side shown in FIG. 6, which is not described herein again.

In the information processing apparatus of this embodiment, an access terminal can display first media information matching the access terminal and second media information corresponding to an accessed terminal on a specified interface of a first application corresponding to the accessed terminal, thereby resolving the problem in the existing technology that when the access terminal accesses the specified interface of the first application of the accessed terminal, only the second media information corresponding to the accessed terminal can be displayed on the specified interface of the first application corresponding to the accessed terminal.

This embodiment provides an information processing system, and the system includes: an access terminal 10, configured to send an access request of a first application to a server 20; receive to-be-recommended first media information that matches the access terminal 10 and that is returned by the server 20 based on the access request, and a first configuration parameter used for displaying the first media information; and display the first media information on a specified interface of the first application according to the first configuration parameter; and a server 20, configured to receive an access request about a first application; obtain a user feature corresponding to an access terminal 10 sending the access request; determine to-be-recommended first media information for the access terminal 10 from a first media information database based on the user feature; obtain a first configuration parameter used for displaying the first media information; and push the first media information and the first configuration parameter to the access terminal 10. Further, the server 20 is further configured to obtain second media information corresponding to the accessed terminal 30; obtain a second configuration parameter used for displaying the second media information; and further pushing the second media information and the second configuration parameter to the access terminal when the first media information and the first configuration parameter are pushed to the access terminal. The access terminal 10 is further configured to display the first media information and the second media information on the specified interface according to the first configuration parameter and the second configuration parameter.

Further, the system further includes: an accessed terminal 30, configured to: when the specified interface of the first application is in an open state, obtain an operation parameter if an operation for setting second media information is received; generate second media information according to the operation parameter; and display the second media information on a preset spatial position of the specified interface, and upload the second media information to the server 20.

Herein, the access terminal includes the information processing apparatus applied to an access terminal in the foregoing embodiments, and the server includes the information processing apparatus applied to a server in the foregoing embodiments, which are not described herein again.

In this embodiment, the access terminal or accessed terminal includes, but is not limited to: a device such as a mobile phone, a portable Android device (PAD), a wearable device, or a camera; and the server may be a cloud server. The terminal may communicate with the server through a network; and the network may be a mobile data network, a wired network, a wireless network, or a hybrid network of a wired network and a wireless network.

In the information processing system of this embodiment, when an access terminal accesses a specified interface of a first application of an accessed terminal, a server can push first media information matching a user feature corresponding to the access terminal, so that the access terminal can display first media information corresponding to the access terminal and second media information corresponding to the accessed terminal on the specified interface of the first application corresponding to the accessed terminal, thereby resolving the problem in the existing technology that when the access terminal accesses the specified interface of the first application of the accessed terminal, only the second media information can be displayed on the specified interface of the first application.

The following provides description by using an example in which the first application is WeChat, the specified interface of the first application is a friend circle interface, the preset spatial position is a personal first-screen photo wall, the first media information is an advertisement, and the server is a WeChat platform.

In the technical solutions of this application, for the position of the personal first-screen photo wall of the WeChat friend circle, various advertising forms (for example, a texts and a video) may be directionally (may be an indicator such as a user feature, a portrait, or a habit) put on the advertising position. When a user clicks the WeChat friend circle, at the position of the personal photo wall accessed at the first screen, the system automatically directionally puts an advertisement to the current user. The advertisement covers the position of the photo wall, and the user may directly click a button to close the advertisement, or the advertisement may be closed itself after being played completely. In consideration of user experience, the advertisement accessed by the user is displayed to the user according to a frequency. The advertisement itself may be played in a loop, and directional advertisements in different forms are put to the user a period of time after the user accesses the advertisement. In addition, a bullet screen function is added to the photo wall, a comment entry and bullet screen display of message flows are added on the personal first screen of the friend circle of the user, and functional buttons for closing and opening the bullet screen are given to the user, which does not affect use of the user for the photo wall.

Specifically, a WeChat platform using the technical solutions of this application supports the following functions:

1. An advertising position (a photo wall advertising position of the personal first-screen) for advertisers to put advertisements is added on the WeChat platform.

2. The personal first-screen photo wall has a function of directional advertising, and a policy of precise advertising according to portraits such as a preference, a feature, and a habit of a user. A keyword or an evaluation tag may be extracted according to a bullet screen message of the user or by analyzing a bullet screen message of the user, which helps precisely push advertisements to the user compared with directional information of the advertisements.

3. Advertising materials may be put in a manner of an image-text, a video, and rich media.

4. The original photo wall function is reserved. It may be considered that advertisements are displayed to the user in manners such as flashing the screen and pasting to a video. An uninterested button may further be added for the user to implement a blocking function.

5. The user may interact with advertisements put on the personal first-screen photo wall. For example, if the user directly clicks a friend circle button, and sees the photo wall of the user, the system may put a photo wall advertising position, and may formulate an uninterested button that disappears in a time or that is for the user to click to close.

6. If the user accesses a personal first-screen photo wall of a merchant, the merchant may promote a custom selected advertising form, so that when a visitor accesses a personal space of the visitor, the visitor can also instantly see promoted advertising information on the first screen. Specifically, when the personal first screen (the position of the photo wall) of the merchant is accessed, advertising products put by the merchant may be seen, and the merchant may edit the advertisement on the photo wall. However, the uploaded materials need to be added with an auditing mechanism, to ensure standardization and security of the advertising materials, and if the advertising materials do not pass auditing, the function of this type of merchants is disabled. The promotion information and materials of the merchant are customized.

7. The bullet screen function in the personal photo wall may enable the user to instantly see messages of others for the user. Not only the user can quickly know exchange information associated lately in the friend circle, but also user activity of the first screen is increased, so that the user participation is stronger. Message reminded content may be embodied in the bullet screen, and if a user accesses a personal photo wall of another user, a message function may be provided and the bullet screen may be opened or closed.

8. An evaluation class tag is added in the photo wall and displayed in the bullet screen, and the system may push related advertising information to directional users according to tag content. With the tag evaluation function of the photo wall, users may evaluate themselves or features of others, to describe features of the current users, and may perform personality display (may being corresponding to a personal text or animation) in the bullet screen of the photo wall.

Certainly, it should be noted that, the current users in the WeChat personal photo wall may find users related to themselves, that is, persons who have personalities and lifestyles consistent with themselves and have the same interests in brands or products with themselves by using information about evaluation for themselves. The WeChat platform performs matching according to common points of the users, recommends a list of users having the common points with the current users to the current users, and supports a function capable of sharing and spreading advertisements they like between the users.

Figure 10:
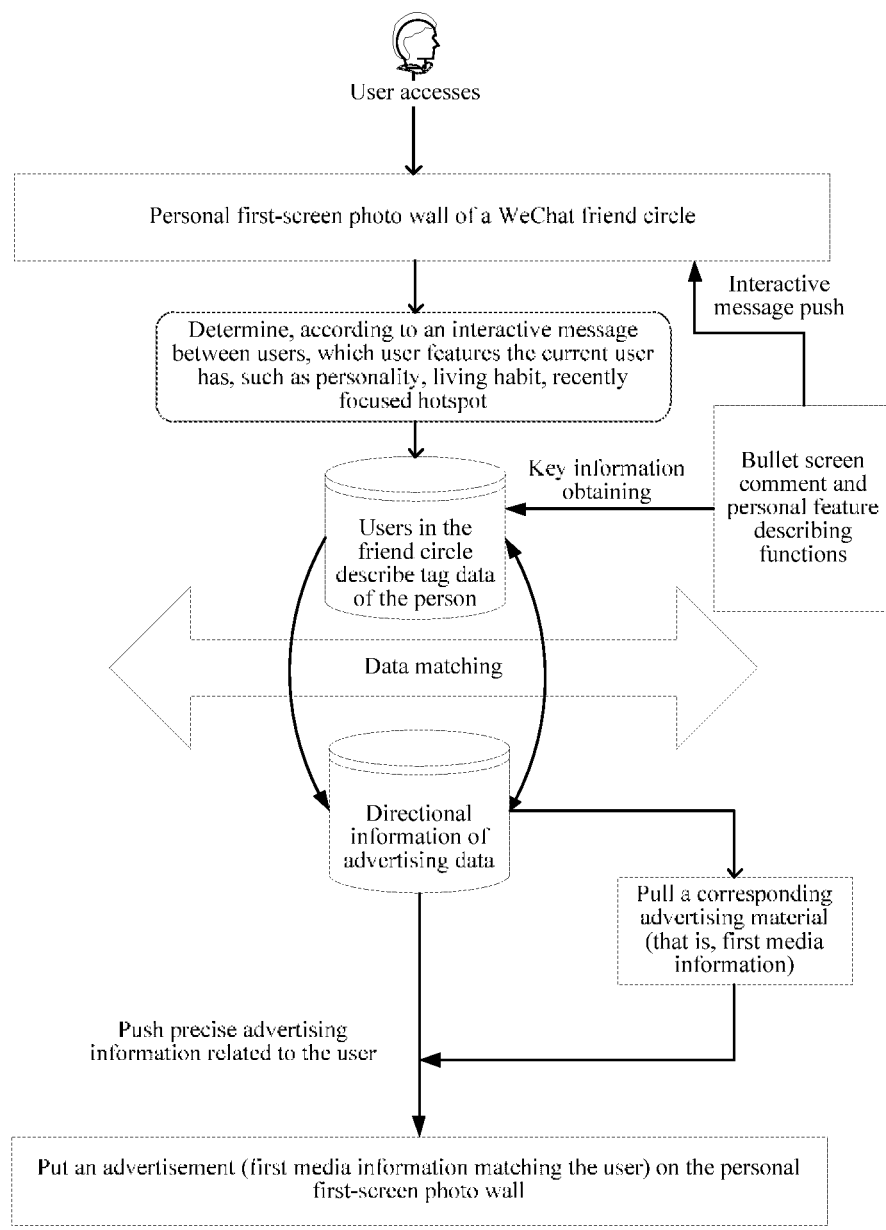
FIG. 10 is a schematic interactive diagram of an information processing system according to an embodiment of this application.

FIG. 10 shows a schematic interactive diagram of an information processing system. As shown in FIG. 10, when receiving an access request that is for user a to access a WeChat friend circle of user a or others and that is sent by terminal A, a server determines, according to an interactive message between users, which user features the current user a has, such as personality, living habit, and recently focused hotspot, then, extracts an advertising material a' matching user a from an advertising material database according to tag data in the WeChat friend circle for describing user a and with reference to directional information of advertising materials, and pushes the advertising material a', to display the advertising material a' on a personal first-screen photo wall of the WeChat friend circle of user a. In addition, the server may obtain key information from a bullet screen function and a personal description function supported on the personal first-screen photo wall, and analyze user tag data according to the key information, for example, obtain the tag data of user a. Moreover, if a bullet screen message or a tag evaluation message that is on the personal first-screen photo wall corresponding to user a and that is sent by terminal A or another terminal is received, the bullet screen message or the tag evaluation message is display on the personal first-screen photo wall corresponding to user a.

This embodiment further provides a computer storage medium. The computer storage medium stores a computer program, and after performed by a processor, the computer program can implement the information processing method applied to a server side according to any one or more of the foregoing embodiments. The computer storage medium may be various types of storage mediums, and may be a non-instantaneous storage medium in this embodiment.

This embodiment further provides a computer storage medium. The computer storage medium stores a computer program, and after performed by a processor, the computer program can implement the information processing method applied to a terminal side according to any one or more of the foregoing embodiments. The computer storage medium may be various types of storage mediums, and may be a non-instantaneous storage medium in this embodiment.

In the several embodiments provided in this application, it should be understood that the disclosed device and apparatus may be implemented in other manners. The described device embodiments are merely exemplary. For example, the unit division is merely logical function division and may be other division during actual implementation. For example, multiple units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, the functional units in the embodiments of this application may all be integrated into one processing unit, or each of the units may independently serve as one unit, or two or more units may be integrated into one unit. The integrated unit may be implemented in the form of hardware, or may be implemented in the form of a hardware plus software functional unit.

A person of ordinary skill in the art may understand that, some or all of steps for implementing the apparatus embodiments may be implemented by using hardware related to a program instruction. The program may be stored in a computer readable storage medium. When the program is executed, the steps including the apparatus embodiments are performed. However, the storage medium includes various types of media that may store program code, for example, a mobile storage device, a read-only memory (ROM), a random access memory (RAM), a magnetic disk, or an optical disc.

Alternatively, when the integrated module in this application is implemented in the form of a software function module and sold or used as an independent product, the integrated module may be stored in a computer readable storage medium. Based on such an understanding, the technical solutions of the embodiments of this application essentially or the part contributing to the existing technology may be implemented in a form of a software product. The computer software product is stored in a storage medium, and includes several instructions for instructing a computer device (which may be a personal computer, a server, a network device, or the like) to perform all or some of the apparatuses in the embodiments of this application. The storage medium includes various media that may store processing code, such as a removable storage device, a ROM, a RAM, a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information processing method, performed by a mobile terminal having one or more processors and memory storing a plurality of programs to be executed by the one or more processors, the method comprising:
  displaying a first graphical user interface of a social networking application, the first graphical user interface including multiple options for a first user of the social networking application to interact with other users of the social networking application;
  receiving a preset trigger operation on one of the multiple options for accessing information shared by the other users with the first user;
  generating an access request in response to the preset trigger operation and sending the access request to a server;
  receiving to-be-recommended first media information that matches a user profile of the first user and that is returned by the server based on the access request, and a first configuration parameter used for displaying the first media information; and
  replacing the first graphical user interface with a second graphical user interface by displaying the first media information in a personal information region of the second graphical user interface according to the first configuration parameter.

2. The method according to claim 1, further comprising:
  receiving the information shared by the other users with the first user, and a second configuration parameter used for displaying the information shared by the other users with the first user; and
  displaying the information shared by the other users with the first user in a shared information region of the second graphical user interface according to the second configuration parameter.

3. The method according to claim 1, further comprising:
  receiving a first operation, wherein the first operation is used for representing control for the first media information;
  determining whether the first operation is an approved operation; and
  responding to the first operation if the first operation is an approved operation.

4. The method according to claim 1, further comprising:
  obtaining a first interactive message from another mobile terminal associated with one of the other users on a preset spatial position of the personal information region of the second graphical user interface; and
  displaying the first interactive message on the preset spatial position, wherein the first interactive message is an interactive message formed by operations of a user using the another mobile terminal.

5. The method according to claim 4, further comprising:
  obtaining a second interactive message from the first user of the mobile terminal on the preset spatial position of the personal information region of the second graphical user interface; and
  displaying the second interactive message on the preset spatial position, wherein the second interactive message is an interactive message formed by operations of the first user using the mobile terminal.

6. The method according to claim 1, wherein the server determines the to-be-recommended first media information by:
  extracting directional information of all first media information in a first media information database, wherein the directional information comprises a user feature attribute of a target push object;
  comparing the user feature attribute with the user profile of the first user;
  identifying first media information whose associated user feature attribute matching the user profile of the first user as the to-be-recommended first media information.

7. The method according to claim 6, wherein the server determines the to-be-recommended first media information by:
  after determining two or more pieces of to-be-recommended first media information:
    formulating a play policy about the to-be-recommended first media information according to a play indicator preset by the server, wherein the play policy comprises at least a play sequence and a play interval; and
    including the play policy in the first configuration parameter.

8. A mobile terminal comprising one or more processors, memory coupled to the one or more processors and a plurality of programs stored in the memory that, when executed by the one or more processors, cause the mobile terminal to perform a plurality of operations comprising:
  displaying a first graphical user interface of a social networking application, the first graphical user interface including multiple options for a first user of the social networking application to interact with other users of the social networking application;
  receiving a preset trigger operation on one of the multiple options for accessing information shared by the other users with the first user;
  generating an access request in response to the preset trigger operation and sending the access request to a server;
  receiving to-be-recommended first media information that matches a user profile of the first user and that is returned by the server based on the access request, and a first configuration parameter used for displaying the first media information; and replacing the first graphical user interface with a second graphical user interface by displaying the first media information in a personal information region of the second graphical user interface according to the first configuration parameter.

9. The mobile terminal according to claim 8, wherein the plurality of operations further comprise:
receiving the information shared by the other users with the first user, and a second configuration parameter used for displaying the information shared by the other users with the first user; and
displaying the information shared by the other users with the first user in a shared information region of the second graphical user interface according to the second configuration parameter.

10. The mobile terminal according to claim 8, wherein the plurality of operations further comprise:
receiving a first operation, wherein the first operation is used for representing control for the first media information;
determining whether the first operation is an approved operation; and
responding to the first operation if the first operation is an approved operation.

11. The mobile terminal according to claim 8, wherein the plurality of operations further comprise:
obtaining a first interactive message from another mobile terminal associated with one of the other users on a preset spatial position of the personal information region of the second graphical user interface; and
displaying the first interactive message on the preset spatial position, wherein the first interactive message is an interactive message formed by operations of a user using the another mobile terminal.

12. The mobile terminal according to claim 11, wherein the plurality of operations further comprise:
obtaining a second interactive message from the first user of the mobile terminal on the preset spatial position of the personal information region of the second graphical user interface; and
displaying the second interactive message on the preset spatial position, wherein the second interactive message is an interactive message formed by operations of the first user using the mobile terminal.

13. The mobile terminal according to claim 8, wherein the server determines the to-be-recommended first media information by:
extracting directional information of all first media information in a first media information database, wherein the directional information comprises a user feature attribute of a target push object;
comparing the user feature attribute with the user profile of the first user;
identifying first media information whose associated user feature attribute matching the user profile of the first user as the to-be-recommended first media information.

14. The mobile terminal according to claim 13, wherein the server determines the to-be-recommended first media information by:
after determining two or more pieces of to-be-recommended first media information:
formulating a play policy about the to-be-recommended first media information according to a play indicator preset by the server, wherein the play policy comprises at least a play sequence and a play interval; and
including the play policy in the first configuration parameter.

15. A non-transitory computer readable storage medium storing a plurality of machine readable instructions in connection with a mobile terminal having one or more processors, wherein the plurality of machine readable instructions, when executed by the one or more processors, cause the mobile terminal to perform a plurality of operations including:
displaying a first graphical user interface of a social networking application, the first graphical user interface including multiple options for a first user of the social networking application to interact with other users of the social networking application;
receiving a preset trigger operation on one of the multiple options for accessing information shared by the other users with the first user;
generating an access request in response to the preset trigger operation and sending the access request to a server;
receiving to-be-recommended first media information that matches a user profile of the first user and that is returned by the server based on the access request, and a first configuration parameter used for displaying the first media information; and
replacing the first graphical user interface with a second graphical user interface by displaying the first media information in a personal information region of the second graphical user interface according to the first configuration parameter.

16. The non-transitory computer readable storage medium according to claim 15, wherein the plurality of operations further comprise:
receiving the information shared by the other users with the first user, and a second configuration parameter used for displaying the information shared by the other users with the first user; and
displaying the information shared by the other users with the first user in a shared information region of the second graphical user interface according to the second configuration parameter.

17. The non-transitory computer readable storage medium according to claim 15, wherein the plurality of operations further comprise:
receiving a first operation, wherein the first operation is used for representing control for the first media information;
determining whether the first operation is an approved operation; and
responding to the first operation if the first operation is an approved operation.

18. The non-transitory computer readable storage medium according to claim 15, wherein the plurality of operations further comprise:
obtaining a first interactive message from another mobile terminal associated with one of the other users on a preset spatial position of the personal information region of the second graphical user interface; and
displaying the first interactive message on the preset spatial position, wherein the first interactive message is an interactive message formed by operations of a user using the another mobile terminal.

19. The non-transitory computer readable storage medium according to claim 18, wherein the plurality of operations further comprise:

obtaining a second interactive message from the first user of the mobile terminal on the preset spatial position of the personal information region of the second graphical user interface; and displaying the second interactive message on the preset spatial position, wherein the second interactive message is an interactive message formed by operations of the first user using the mobile terminal.

20. The non-transitory computer readable storage medium according to claim 18, wherein the server determines the to-be-recommended first media information by:

extracting directional information of all first media information in a first media information database, wherein the directional information comprises a user feature attribute of a target push object;

comparing the user feature attribute with the user profile of the first user;

identifying first media information whose associated user feature attribute matching the user profile of the first user as the to-be-recommended first media information.

* * * * *